United States Patent [19]
Hockett

[11] Patent Number: 5,033,776
[45] Date of Patent: Jul. 23, 1991

[54] COMPONENT COUPLING APPARATUS

[75] Inventor: Wayne Hockett, Tampa, Fla.

[73] Assignee: Continuous Hose Corp., Boynton Beach, Fla.

[21] Appl. No.: 413,845

[22] Filed: Sep. 27, 1989

[51] Int. Cl.$^5$ .............................................. F16L 25/00
[52] U.S. Cl. ..................................... 285/238; 285/297
[58] Field of Search ................... 285/38, 92, 214, 297, 285/289, 238, 915; 156/303.1, 294, 305

[56] References Cited

U.S. PATENT DOCUMENTS

| | | | |
|---|---|---|---|
| 1,081,226 | 12/1913 | Forst | 285/238 |
| 1,463,461 | 7/1923 | Davis | 285/297 |
| 1,649,594 | 11/1927 | Johnson | 285/238 |
| 2,245,101 | 6/1941 | Cole | 285/238 |
| 2,366,067 | 12/1944 | Smith | 285/238 |
| 2,787,480 | 4/1957 | Staller | 285/238 |
| 4,143,892 | 3/1979 | Murphy et al. | 285/297 |
| 4,519,637 | 5/1985 | Folkers | 285/238 |
| 4,666,188 | 5/1987 | Hockett | 295/92 |
| 4,666,193 | 5/1987 | Hockett | 285/334.3 |

FOREIGN PATENT DOCUMENTS 1174971 3/1959 France ............................ 285/915
240871 5/1946 Switzerland ..................... 285/238

Primary Examiner—Eric K. Nicholson
Attorney, Agent, or Firm—Frijouf, Rust & Pyle

[57] ABSTRACT

A coupling apparatus and method is disclosed for coupling a first hose for enabling the flow of a fluid therethrough, comprising a first coupling member having a first coupling internal bore extending between an inner end and an outer end. First coupling threads are defined in the first coupling member proximate the inner end whereas first coupling linking threads are defined by the first coupling internal bore of the first coupling member proximate the outer end. A second coupling member has second coupling threads defined therein. A first attachment member has first attachment linking threads with means for affixing the first hose attachment member to the first hose. The first attachment linking threads are engagable with the first coupling linking threads for securing the first hose to the first coupling means. The first coupling threads are engagable with the second coupling threads for interconnecting the first coupling member and the second coupling member for coupling the first hose thereto.

42 Claims, 6 Drawing Sheets

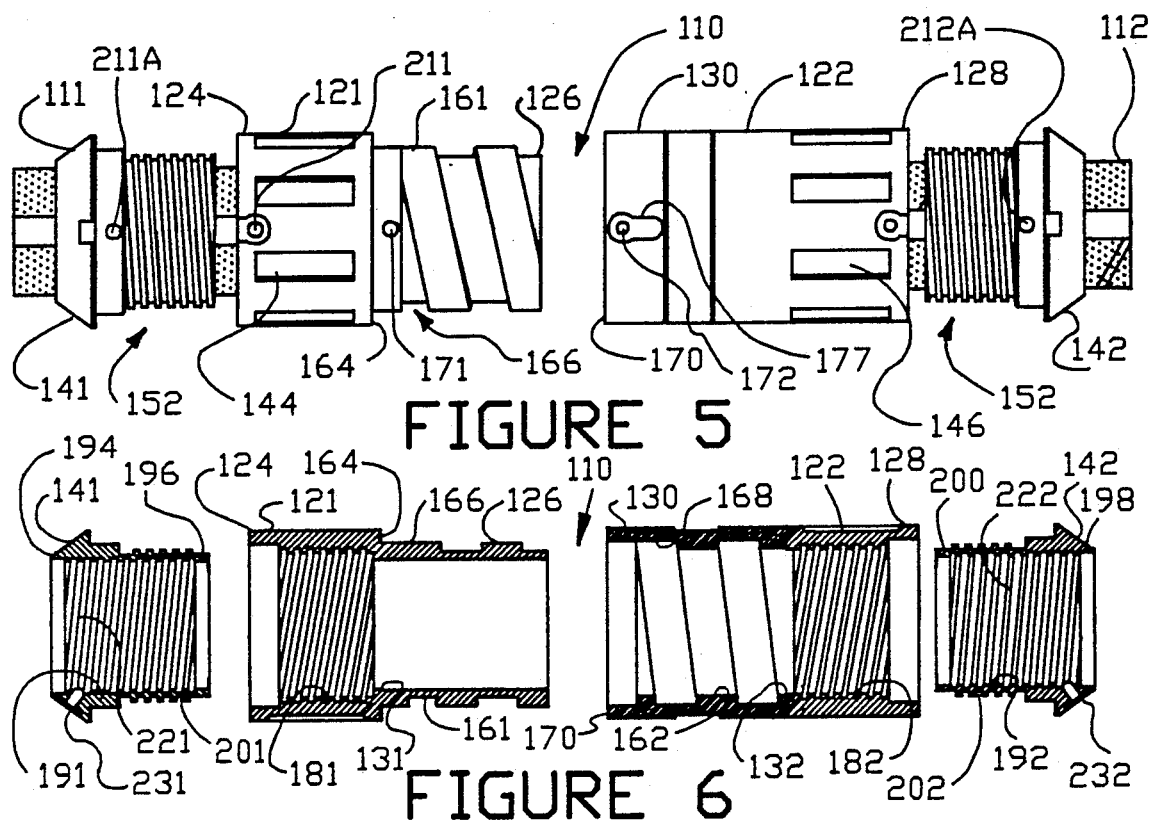
FIGURE 5
FIGURE 6
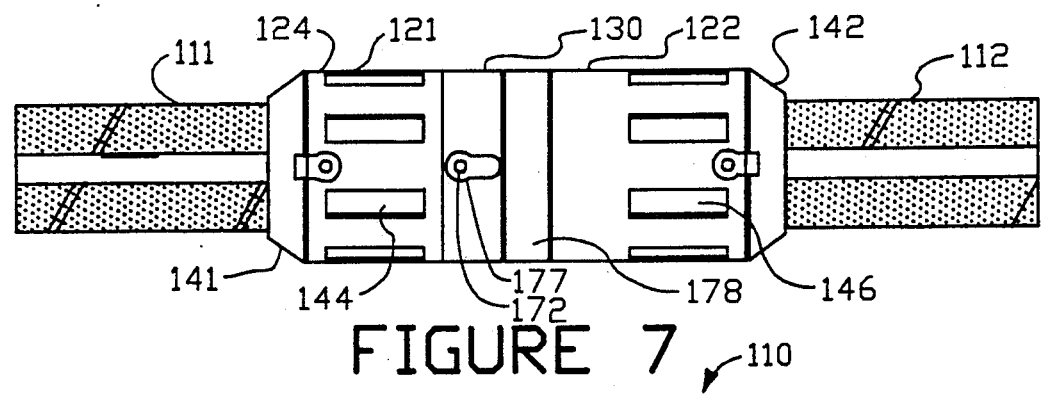
FIGURE 7
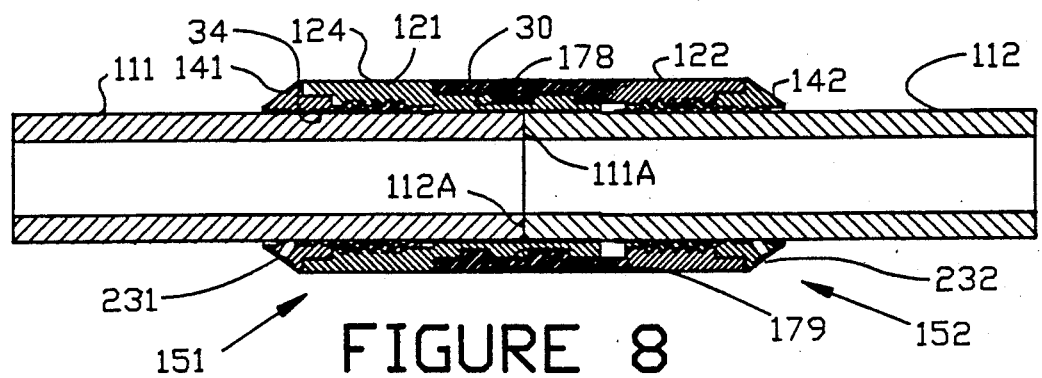
FIGURE 8

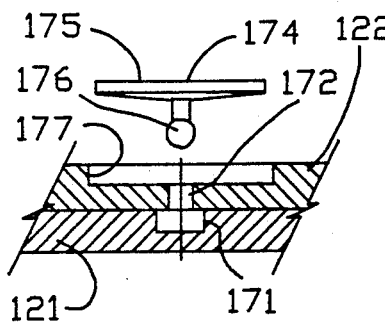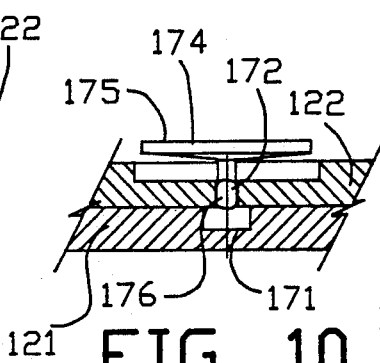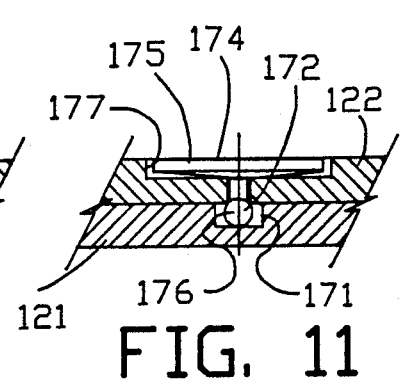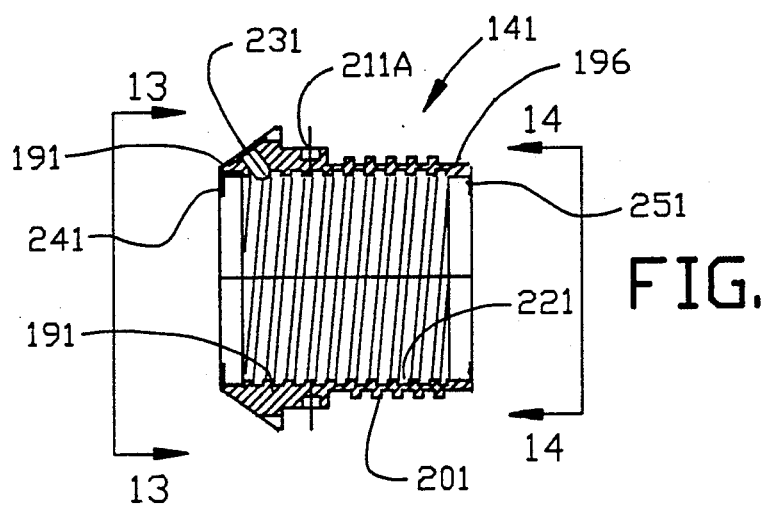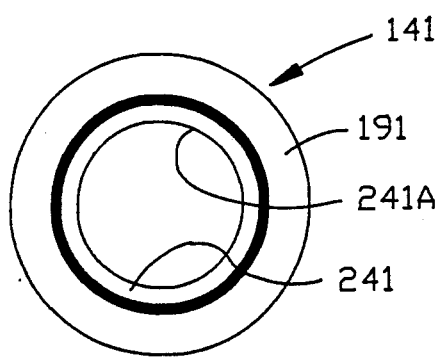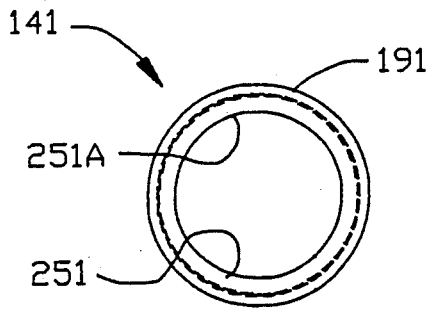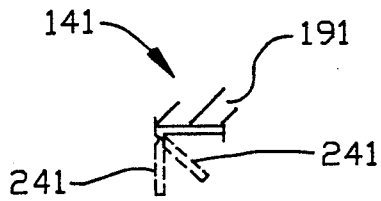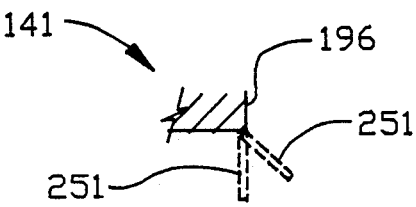

COMPONENT COUPLING APPARATUS

BACKGROUND OF THE INVENTION

1. Field Of The Invention

This invention relates to fluid coupling and more particularly to an improved coupling device for facilitating the coupling of a hose for use under fluid pressure.

2. Prior Art Statement

Various types of fluid coupling devices have been proposed in the prior art for coupling a hose for transmitting a wide variety of gases and liquids with a solid suspended therein. Coupling devices have been utilized for coupling hydraulic fluids, liquids, semi-solids and the like. Among the most difficult materials to transmit through a fluid coupling device are high pressure fluids such as high pressure liquids and/or high pressure gases with the solid particulate material suspended therein. In the field of sand blasting, wet blasting and painting, the difficulties encountered with fluid couplings are particularly troublesome due to the abrasive quality of the sand blasting or wet blasting materials.

In a typical sand blasting operation, a high pressure air compressor forces particulate abrasive material in the form of sand particles through a hose to a nozzle whereat the fluid projects the abrasive particles to a surface for cleaning and removing undesirable surface material. In general, the hose interconnecting the high pressure air compressor and the nozzle is composed of a plurality of hose sections interconnected by hose couplings. In the past, the hose couplings were typically formed from a metallic material and interconnected the hose sections to form a fluid tight conduit between the high pressure air compressor and the sand blasting nozzle. Since the abrasive material was transmitted through the hose and couplings at a high rate, it was common for the hose to become abraded and fracture at a point particularly where the hose would undergo a small radius bend. In addition, the high velocity abrasive material would likewise abrade the couplings interconnecting the hose sections, thereby deteriorating the fluid tight seals in the coupling member. The deterioration of the fluid tight seal, typically an O-ring in the coupling member, would cause high pressure leaks which further increased the leak in the coupling member resulting in the failure of the coupling member. Accordingly, the coupling member would have to be replaced by a new coupling. It should be appreciated that a typical sand blasting operation incorporates a multitude of coupling members between the air compressor and the nozzle. The replacement of the coupling members caused a substantial downtime for the sand blasting operation, resulting in enormous expense in some situations, for example a ship located in a dry dock. The dry dock fees of large ships are very substantial and the failure of a low cost coupling member resulted in a very substantial loss in the overall cost of the sand blasting operation.

In my prior U.S. Pat. No. 4,666,193 issued May 19, 1987, I disclosed a novel pipe coupling incorporating an insert which provided a partial solution to the above problems of the prior art.

In my subsequent U.S. Pat. No. 4,666,188 issued May 19, 1987, I disclosed a superior coupling member made of a resilient plastic material which was suitable for use with high pressure fluids and/or liquids and specifically suitable for sand blasting and wet blasting operations. In this superior coupling member, the end of a first hose was abutted against an end of a second hose to provide a hose to hose coupling and to eliminate any metallic material interposed between the first and second hoses. This invention eliminated any contact of the abrasive material with any coupling material of the coupling members.

It is a primary object if the present invention to provide an improvement to my prior invention set forth in U.S. Pat. No. 4,666,188 which improvement is lower in cost and which is more convenient in the connection of a hose to the coupling member.

Another object of the present invention is to provide a coupling apparatus for coupling a first and a second hose comprising a first and a second coupling member having first and second coupling thread means enabling the first coupling member to be threadably engaged with the second threaded member.

Another object of the present invention is to provide a coupling apparatus for coupling a first and a second hose wherein the first and second coupling members are constructed of a resilient and deformable material for enabling radial expansion of the first and second coupling members upon the application of fluid pressure in combination with means for inhibiting the radial expansion of the second coupling member, whereby the radial expansion of the first coupling member within the second coupling member creates a fluid tight seal therebetween.

Another object of the present invention is to provide a coupling apparatus for coupling a first and a second hose including a locking pin to releasably inhibit relative rotation between the first and second coupling members.

Another object of the present invention is to provide a coupling apparatus for coupling a first and a second hose having a first and a second attachment member connected to the first and second hoses, respectively, with a flowable adhesive.

Another object of the present invention is to provide a coupling apparatus for coupling a first and a second hose, wherein the first and second hoses are secured to a first and a second attachment means and the first and second attachment means are secure to a first and a second coupling member of the coupling apparatus by linking thread means enabling the hose sections to be readily attached to the coupling apparatus.

Another object of the present invention is to provide a coupling apparatus for coupling a first and a second hose wherein the first and second coupling thread means have an integral number of turns for enabling the insertion of a first hose section between a second and third hose section while maintaining the preferred orientation of the first, second and third hose sections.

Another object of the present invention is to provide a coupling apparatus for coupling a first and a second hose which enables a hose to hose coupling such that the first and second coupling members are not exposed to the material internal the hose.

Another object of the present invention is to provide a coupling apparatus for coupling a first and a second hose wherein the first and second coupling members are constructed of a low cost polymeric material.

Another object of the present invention is to provide a coupling apparatus for coupling a first and a second hose which is lower in cost, more reliable, and provides easier replacement of the coupling member on a hose than heretofore known in the art.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus for coupling a first and a second hose to enable the flow of a fluid therethrough. The apparatus comprises a first coupling member having an inner end and an outer end with a first coupling internal bore extending therebetween. First coupling threads are disposed proximate the inner end of the first coupling member whereas first coupling linking threads are defined in the first coupling internal bore proximate the outer end of the first coupling member. A second coupling member has an inner end and an outer end with a second coupling internal bore extending therebetween. Second coupling threads are disposed proximate the inner end of the second coupling member whereas second coupling linking threads are defined in the second coupling internal bore proximate the outer end of the second coupling member. A first attachment member has first attachment linking threads with first affixing means for affixing the first hose attachment member to the first hose. A second hose attachment member has second attachment linking threads with second affixing means for affixing the second hose attachment member to the second hose. The first attachment linking threads are engagable with the first coupling linking threads for securing the first hose to the first coupling member. In a similar manner, the second attachment linking threads are engagable with the second coupling linking threads for securing the second hose to the second coupling member. The first coupling threads are engagable with the second coupling threads for interconnecting the first coupling member and the second coupling member for joining the first hose to the second hose.

In a more specific embodiment of the invention, the first coupling member is insertable into the second coupling internal bore of the second coupling member when the first coupling threads engage with the second coupling threads. Preferably, the first and second coupling member are constructed of a resilient material for enabling radial expansion of the first and second coupling members upon the application of a fluid pressure within the first and the second hoses. A means is secured to the second coupling member for inhibiting radial expansion of the second coupling member to enable the radial expansion of the first coupling member within the second coupling member to create a fluid tight seal therebetween.

The first attachment member includes a first inner attachment end and a second outer attachment end with the first attachment linking threads being defined on an outer surface of the first attachment member proximate the first inner attachment end. The first inner attachment end of the first attachment member is insertable into the first coupling internal bore proximate the outer end of first coupling member for enabling the first attachment linking threads to engage with the first coupling linking threads of the first coupling member. In a similar manner, the second attachment member includes a second inner attachment end and a second outer attachment end with the second attachment linking threads being defined on an outer surface of the second attachment member proximate the second inner attachment end. The second inner attachment end of the second attachment member is insertable into the second coupling internal bore proximate the outer end of second coupling member for enabling the second attachment linking threads to engage with the second coupling linking threads of the second coupling member.

The coupling apparatus may include a first and a second coupling locking apertures disposed in the first and the second coupling members, respectively with a coupling locking pin cooperating with the first and second coupling locking apertures to releasably inhibit relative rotation between the first and second coupling members.

The first affixing means includes a first attachment internal bore for receiving the first hose therein with first affixing threads defined in the first attachment internal bore of the first attachment member. Similarly, the second affixing means includes a second attachment internal bore defined in the second attachment member with second hose threads defined in a second attachment internal bore of the second hose attachment. The first and second attachment internal bores are adapted to receive the first and second hoses therein. The first affixing means includes a first input aperture defined in the first attachment member and communicating with the first attachment internal bore whereas the second affixing means includes a second input aperture defined in the second attachment member and communicating with the second attachment internal bore. The input apertures provide means for inserting a flowable adhesive into the first and second attachment bores for bonding the flowable adhesive to the first and the second hoses, respectively. The inserted flowable adhesive cures within the first and second attachment internal bores and bonds to the first and the second hoses thereby creating first and second hose threads bonded to the first and the second hose, respectively. The first and second hose threads of the first and second hoses cooperate with the first and second affixing threads of the first and second attachment members for securing the first and second hoses to the first and second attachment members, respectively.

In one embodiment, a first restricting wall is disposed in the first attachment internal bore for engaging with the first hose and a first yielding wall disposed in the first attachment internal bore for engaging with the first hose. The first restricting wall restricts the flow of the flowable adhesive from the first attachment internal bore and the first yielding wall permits the flow of the flowable adhesive from the first attachment internal bore to enable the flowable adhesive to occupy the entire void located between the first attachment internal bore and the first hose. In a similar manner, the second attachment internal bore for engaging with the second hose and a second yielding wall disposed in the second attachment internal bore for engaging with the second hose. The second restricting wall restricts the flow of the flowable adhesive from the second attachment internal bore and the second yielding wall permits the flow of the flowable adhesive from the second attachment internal bore to enable the flowable adhesive to occupy the entire void located between the second attachment internal bore and the second hose. In this embodiment, the first input aperture is disposed between the first restricting wall whereas the first yielding wall and the second input aperture being disposed between the second restricting wall and the second yielding wall. Preferably, the first restricting wall and the first yielding wall of the first attachment internal bore engage with the first hose to center the first hose within the first attachment internal bore. In a similar manner, the second restricting wall and the second yielding wall of the second attachment internal bore engage with the second hose to center the second hose within the second attachment internal bore.

The coupling apparatus may include attachment locking apertures disposed in each of the coupling members and the attachment members with attachment locking pins cooperating with the attachment locking apertures to releasably inhibit relative rotation between the coupling member and the attachment member.

The invention is also incorporated into the method of attaching a coupling member to an end of a hose. The method comprises the steps of forming an attachment member including attachment linking threads and an attachment internal bore for receiving the hose therein. Affixing threads are formed in the attachment internal bore of the attachment member. A restricting wall and a yielding wall is formed in the attachment internal bore for engaging with the hose with an input aperture in the attachment member communicating with the attachment internal bore between the restricting wall and the yielding wall. The end of the hose is inserted into the attachment internal bore with the restricting wall and the yielding wall engaging with the hose. A flowable adhesive is inserted into the input aperture enabling the adhesive to flow into the attachment internal bore with the restricting wall restricting the flow of the flowable adhesive from the attachment internal bore and with the yielding wall permitting the flow of the flowable adhesive from the attachment internal bore to enable the flowable adhesive to occupy the entire void located between the attachment internal bore and the hose. The adhesive within is cured in the attachment internal bore to bond to the hose thereby creating hose threads bonded to the hose with the hose threads cooperating with the affixing threads of the attachment member for securing the hose to the attachment member. The attachment linking threads of the attachment member are threaded into the coupling linking threads of the coupling member for attaching the hose to the coupling member.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 5 is a side elevational view of a first embodiment of the improved coupling apparatus of the present invention in an uncoupled position;

FIG. 6 is a side sectional view of the improved coupling apparatus of FIG. 5 with the hoses being removed;

FIG. 7 is a side elevational view of the improved coupling apparatus of FIG. 5 in the coupled position;

FIG. 8 is a side sectional view of the improved coupling apparatus of FIG. 5;

FIG. 9 is an enlarged sectional view illustrating a first and a second locking aperture with a locking pin being removed;

FIG. 10 is a view similar to FIG. 9 with the locking pin being partially inserted;

FIG. 11 is a view similar to FIG. 9 with the locking pin being completely inserted;

FIG. 12 is an enlarged sectional view of an attachment member of the improved coupling;

FIG. 13 is a left end elevational view of the attachment member of FIG. 12;

FIG. 14 is a right end elevational view of the attachment member of FIG. 12;

FIG. 15 is an enlarged sectional view of a portion of FIG. 12 illustrating a restricting wall;

FIG. 16 is an enlarged sectional view of a portion of FIG. 12 illustrating a yielding wall;

Similar reference characters refer to similar parts throughout the several Figures of the drawings.

DETAILED DISCUSSION

Figure 1:
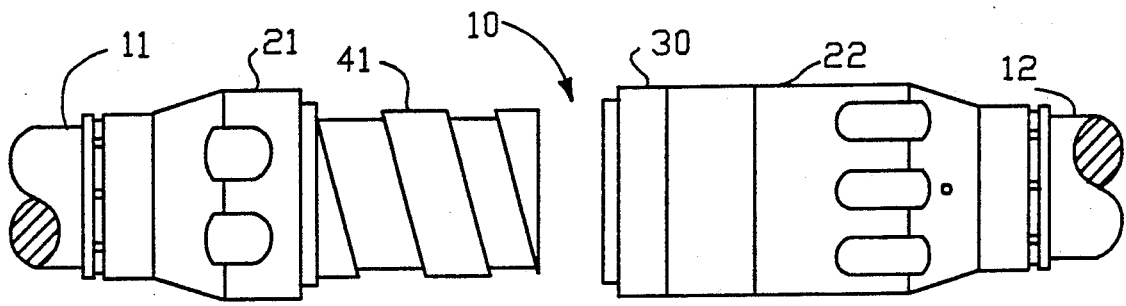
FIG. 1 is a side elevational view of a prior art coupling apparatus in an uncoupled position.
Figure 2:
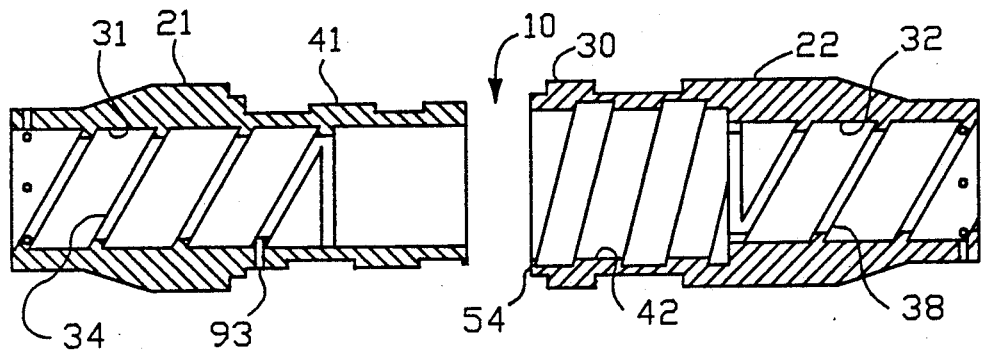
FIG. 2 is a side sectional view of the prior art coupling apparatus of FIG. 1 with the hoses being removed.

FIG. 1 is a side elevational view of a prior art coupling apparatus 10 for coupling a first and a second hose 11 and 12 as set forth in U.S. Pat. No. 4,666,188 . The coupling apparatus 10 comprises a first coupling member 21 and a second coupling member 22. A first internal bore 31 shown more fully in FIG. 2 extends between the ends of the first coupling member 21 whereas a second internal bore 32 extends between the ends of the second coupling member 22. The first hose 11 is inserted into the first coupling member 21 and is secured thereto by first minor thread means 34 disposed within the first internal bore 31 in combination with an adhesive 36 shown in FIG. 4. In a similar manner, the second hose 12 is inserted through an end of the second coupling member 22 and is secured thereto by second internal minor thread means 38 in combination with an adhesive 40. The first coupling member 21 includes first major thread means 41 whereas the second coupling member 22 includes second major thread means 42 which enable a threadable engagement between the first and second coupling members 21 and 22.

Figure 3:
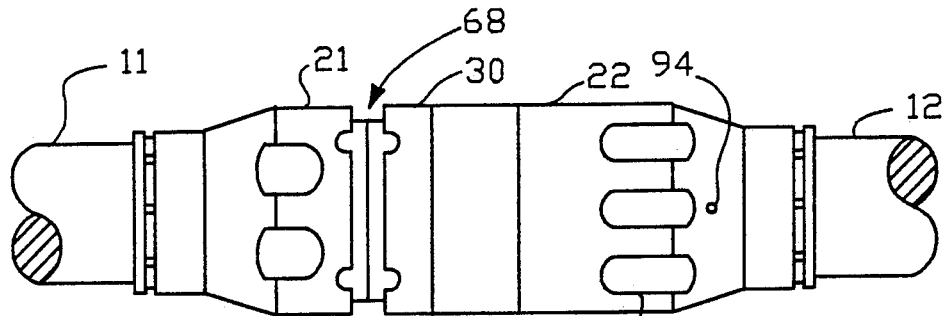
FIG. 3 is a side elevational view of the prior art coupling apparatus of FIG. 1 in the coupled position.
Figure 4:
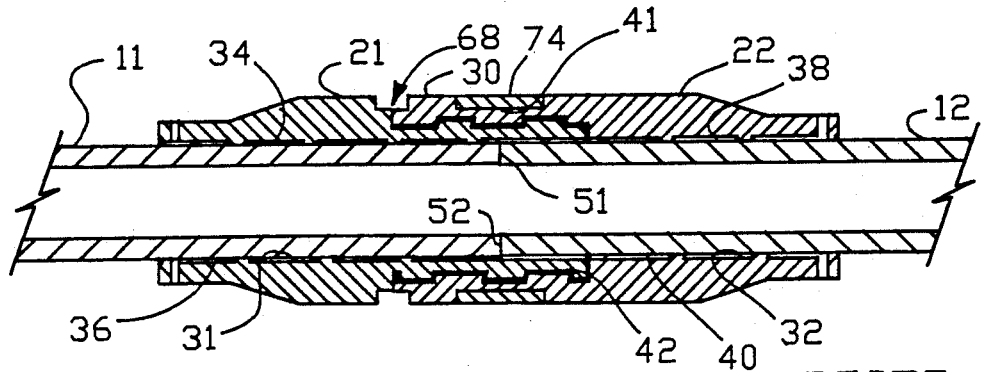
FIG. 4 is a side sectional view of the prior art coupling apparatus of FIG. 3.

FIG. 3 and 4 are an elevational view and a side sectional view of the coupling apparatus 10 being threadably engaged with the first major thread means 41 engaging the second major thread means 42. The first hose 11 and the second hose 12 are located within the first and second coupling members 21 and 22 such that the first end 51 of the first hose abuts the end 52 of the second hose when the first major thread means 41 fully engages the second major thread means 42. The hose-to-hose contact inhibits any direct contact of the material internal the first and second hoses 11 and 12 with the first and second coupling members 21 and 22.

The first and second coupling member 21 and 22 include filling apertures 93 and 94 for enabling the introduction of the flowable adhesives 36 and 40. The end 51 of the first hose 11 is inserted into the internal bore 31 of the first coupling member 21 and the flowable adhesive is forced under pressure through the filling aperture 93 to propagate and fill all voids between the hose 11 and the internal bore 31. The flowable adhesive fills all voids between the first internal minor threads 34 thus creating adhesive threads in the adhesive bonding to the hose 11. The adhesive threads matingly engage with the first internal minor threads 34 to threadably engage hose 11 to the first coupling 21. Upon curing of the adhesive material 36, the first hose 11 is mechanically bonded to the first coupling member 11 through the first internal minor threads 34 and the structural hose threads. In a similar manner, the flowable adhesive 40 fills all voids between the second internal minor threads 38 and the second hose 12 thus creating adhesive threads in the adhesive bonding to the second hose 12. The adhesive threads matingly engage with the second internal minor threads 38 to threadably engage the second hose 12 to the second coupling 22. Upon curing of the adhesive material 10, the second hose 12 is mechanically bonded to the second coupling member 12 through the second internal minor thread 38 and the structural hose threads.

A metallic locking ring (not shown) may be disposed within recess 68 in the first and second coupling members 21 and 22 to prevent relative rotation between the first and second coupling members 21 and 22. A restraining metallic band 74 in the second coupling member 22 inhibits the radial expansion of the second coupling member 22. The first coupling member 21 is made of a resilient material which radially expands upon the application of fluid pressure. The restraining means 74 inhibits the radial expansion of the second coupling member 22 resulting in a fluid tight seal between the first and second coupling members 21 and 22.

The prior art coupling apparatus 10 shown in FIGS. 1–4 and as set forth in U.S. Pat. No. 4,666,188 provided a substantial improvement in the coupling art. Although the coupling apparatus 10 shown in FIGS. 1–4 may be reused by securing a new hose to the coupling members 21 and 22, the improved coupling 110 of the present invention shown in FIGS. 5–29 facilitate the process of securing a new hose to the coupling apparatus 110.

FIG. 5 is a side elevational view of the improved coupling apparatus 110 of the present invention for coupling a first and a second hose 111 and 112 to enable the flow of a fluid therethrough. The coupling apparatus 110 is suitable for use with liquids and gases as well as combinations thereof or with liquids or gases transmitting liquids or solid particles therein. The improved coupling apparatus 110 comprises a first coupling member 121 and a second coupling member 122 with the first coupling member 121 having an outer end 124 and an inner end 126. The second coupling member 122 includes an outer end 128 and an inner end 130. A first coupling internal bore 131 shown more fully in FIG. 6 extends between the outer end 124 and the inner end 126 whereas a second coupling internal bore 132 extends between the outer end 128 and the inner end 130 of the second coupling member 122.

The first hose 111 is inserted into the outer end 124 of the first coupling member 121 and is secured thereto by a first attachment member 141 received within the first internal bore 131 in combination with a first affixing means 151 shown in FIG. 8 as will be explained in more detail hereinafter. In a similar manner, the second hose 112 is inserted into the outer end 128 of the second coupling member 122 and is secured thereto by a second attachment member 142 received within the second internal bore 132 in combination with a second affixing means 152. The first and second coupling members 121 and 122 are provided with first and second grasping members 144 and 146 shown as indentations for facilitating relative rotation between the first and second coupling members 121 and 122.

As is can be clearly shown from the sectional view of FIG. 6, first coupling threads 161 are located on the inner end 126 of the first coupling member 121 whereas second coupling threads 162 are located on the inner end 130 of the second coupling member 122 to enable a threaded engagement between the first and second coupling members 121 and 122. The inner end 126 of the first coupling member 121 comprises a shoulder 164 defining an undercut region 166 which undercut region 166 is received within an enlarged region 168 of the second internal bore 132 disposed on the inner end 130 of the second coupling member 122. The first coupling threads 161 are disposed on the undercut region 166 whereas the second coupling threads 162 are defined by the enlarged region 168 of the second internal bore 132.

FIG. 7 is an elevational view of the coupling apparatus 110 being threadably engaged with the first coupling threads 161 engaging with the second coupling threads 162. FIG. 8 is a side sectional view of the coupling apparatus 110 of FIG. 7 which illustrates an end 111A of the first hose 111 abutting an end 112A of the second hose 112 thereby creating a hose to hose coupling and thus eliminating direct contact of the material internal the first and second hoses 111 and 112 with the first and second coupling members 121 and 122. The first hose 111 and the second hose 112 are positioned within the first and second coupling members 121 and 122 such that the end 111A of the first hose abuts the end 112A of the second hose 112 when the first coupling threads 161 fully engage with the second coupling threads 162 and a shoulder 170 of the second coupling member 122 engages with the shoulder 164 of the first coupling member 121.

A first coupling locking aperture 171 is defined in the first coupling member 121 and is aligned with a second coupling locking aperture 172 defined in the second coupling member 122. FIGS. 9-11 illustrate the second coupling locking aperture 172 being smaller in diameter relative to the first coupling locking aperture 171. A locking pin 174 is preferably a resilient plastic pin having a head 175 and an enlarged terminal end 176 enabling the locking pin 174 to be resiliently retained by the first locking aperture 171. FIG. 10 illustrates the locking pin 174 being inserted within the second locking aperture 172 with the enlarged terminal end 176 being larger than the second locking aperture 172 and being deformed thereby. FIG. 11 illustrates the locking pin 174 being totally inserted within the first and second locking apertures 171 and 172 with the enlarged terminal end 176 being retained within the larger first locking aperture 171 and with the head 175 being received by a recess 177 in the second coupling member 122. When the locking pin 174 is disposed within the locking apertures 171 and 172 as shown in FIG. 11, the locking pin 174 prevents relative rotation between the first and second coupling members 121 and 122.

The second coupling member 122 includes a restraining metallic band 178 which is received within a annular recess 179 for inhibiting radial expansion of the second coupling member 122. The restraining means 178 is preferably a metallic band which may be located within the annual recess 179 and fastened together or in the alternative may be heat shrunk into the annular recess 179 as should be well known to those skilled in the art.

The first and second coupling members 121 and 122 are preferably made of a resilient and deformable material such as a polymeric material which radially expands upon the application of fluid pressure within the first and second hoses 111 and 112. The expansion of the first coupling member 121 is applied against the enlarged region 168 of the second coupling member 122. Since the restraining means 178 inhibits the radial expansion of the second coupling member 122, the first coupling threads 161 are sealed against the second coupling threads 162 resulting in a fluid tight seal therebetween. Additionally, as can be clearly seen in FIG. 8, the restraining band 178 is disposed adjacent the abutment of the end 111A of the first hose 111 and the end 112A of the second hose 112. Accordingly, the restraining means 179 adds mechanical strength at the abutment of the first and second hoses 111 and 112 in addition to enhancing the seal between the first and second coupling threads 161 and 162 by allowing radial expansion of the first coupling member 121 and inhibiting radial expansion of the second coupling member 122.

The first coupling member 121 includes first coupling linking threads 181 defined by the first coupling internal bore 131 proximate the outer end 124 of the first coupling member 121. In a similar manner, the second coupling member 122 includes second coupling linking threads 182 defined by the second coupling internal bore 132 proximate the outer end 128 of the second coupling member 122.

The first attachment member 141 includes a first attachment internal bore 191 extending between an outer end 194 and an inner end 196 of the first attachment member 141. First attachment linking threads 201 are defined on an outer surface proximate the inner end 196 of the first attachment member 141. The second attachment member 142 includes a second attachment internal bore 192 extending between an outer end 198 and an inner end 200 of the second attachment member 142. Second attachment linking threads 202 are defined on an outer surface proximate the inner end 200 of the second attachment member 142. The first attachment linking threads 201 are engagable with the first coupling linking threads 181 for securing the first attachment member 141 to the first coupling member 121. Similarly, the second attachment linking threads 202 are engagable with the second coupling linking threads 182 for securing the second attachment member 142 to the second coupling member 122.

A first coupling attachment locking aperture 211 is defined in the first coupling member 121 and may be aligned with a first attachment locking aperture 211A defined in the first attachment member 141. A second coupling attachment locking aperture 212 is defined in the second coupling member 122 and may be aligned with a second attachment locking aperture 212A defined in the second attachment member 142. Locking pins (not shown) are insertable within the locking aperture 211, 211A, 212 and 212A in a manner similar to FIGS. 9-11. When the locking pins are disposed within the locking apertures 211 and 211A and 212 and 212A, the locking pin prevent relative rotation between the first and second coupling members 121 and 122 and the first and second attachment members 141 and 142, respectively. The locking apertures 211 and 211A and 212 and 212A are preferably identical to the locking apertures 171 and 172 making the required locking pins interchangeable with the locking pin 174 shown in FIGS. 9-12.

As best shown in FIGS. 12-16, the first affixing means 151 includes first affixing threads 221 defined in the first attachment internal bore 191 of the first attachment member 141. A first input aperture 231 is defined in the first attachment member 141 between a first restricting wall 241 and a first yielding wall 251 and communicates with the first attachment internal bore 191. Similarly, the second affixing means 152 includes second affixing threads 222 defined in the second attachment internal bore 192 of the second attachment member 142. A second input aperture 232 is defined in the second attachment member 142 between a second restricting wall and a second yielding wall and communicates with the second attachment internal bore 192 in a manner similar to FIGS. 12-16. The input apertures 231 and 232 provide means for inserting a flowable adhesive into the first and second attachment bores 191 and 192 for bonding the flowable adhesive to the first and the second hoses 111 and 112, respectively.

As shown in FIGS. 13 and 15, the first restricting wall 241 is an annular flexible wall having a central aperture 241A which is smaller than the diameter of the first hose 111 for flexing the first restricting wall 241 as shown in FIG. 15. In a similar manner and as shown in FIGS. 14 and 16, the first yielding wall 251 is an annular flexible wall having a central aperture 251A which is smaller than the diameter of the first hose 111 for flexing the first yielding wall 251 as shown in FIG. 16. The first restricting wall 241 and the first yielding wall 251 extends generally perpendicular from and into attachment internal bore 191 in an unattended position.

Upon the insertion of the first hose 111 into the first attachment bore 191, the first hose 111 flexes the first restricting wall 241 into the phantom position as shown in FIG. 15. Similarly, upon the insertion of the first hose 111 into the first attachment bore 191, the first hose 111 flexes the first yielding wall 251 into the phantom position as shown in FIG. 16.

The inward flexing of the first restricting wall 241 by the insertion of first hose 111 from the outer attachment end 194 causes the restricting wall 241 inhibiting the flow of the adhesive towards the left in FIG. 15. Similarly, the inward flexing of the first yielding wall 251 by the insertion of first hose 111 from the outer attachment end 194 causes the yielding wall 251 permitting the flow of the adhesive towards the right in FIG. 16. In addition, the resiliency of the first restricting wall 241 and the first yielding wall 251 results in a resilient engagement with the first hose 111 to center the first hose 111 within the attachment internal bore 191.

The first and second attachment members 141 and 142 are preferably made of a resilient and deformable material such as a polymeric material. In one embodiment of the invention, the restricting wall and the yielding wall are molded with the attachment member as a unitary, one-piece unit from a polymeric material.

FIGS. 17-20 illustrate the method of inserting a flowable adhesive within the first attachment internal bore 191 to bond the first hose 111 to the first attachment member 141. In this example, the diameter of the hose 111 is slightly smaller than the diameter of the first attachment internal bore 191.

Figure 17:
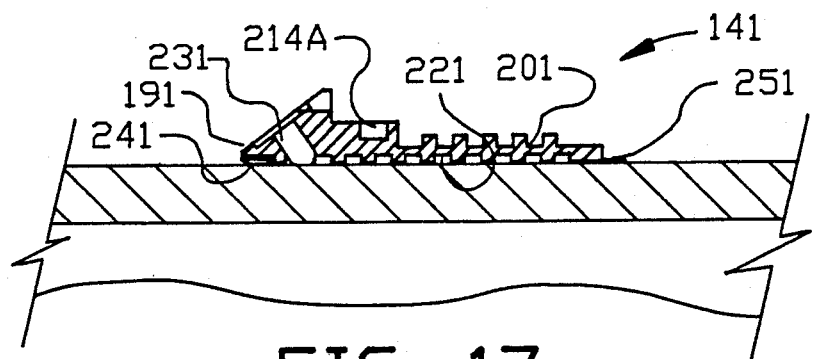
FIG. 17 is a side sectional view of the attachment member of FIGS. 12-16 with a standard diameter hose being disposed therein.

FIG. 17 illustrates the first hose 111 inserted into the first attachment bore 191 from the outer attachment end 194 with the diameter of the first hose 111 flexing the first restricting wall 241 and the first yielding wall 251 as shown in FIGS. 15 and 16. The first hose 111 is positioned such that the end 111A of the first hose abuts the end 112A of the second hose 112 when the first and second attachment members 141 and 142 are threadably secured to the first and second members 121 and 122 and when the first coupling threads 161 fully engage the second coupling threads 162 as shown in FIG. 7.

Figure 18:
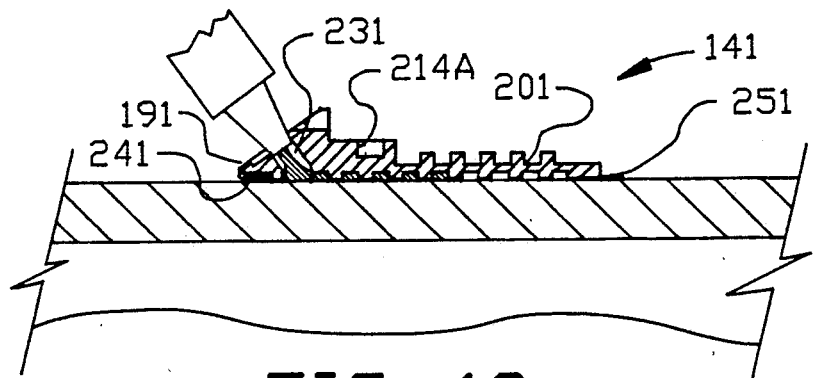
FIG. 18 is a sectional view of the attachment member of FIG. 17 being partially filled with a flowable adhesive.

FIG. 18 illustrates the introduction of the flowable adhesive through the first input aperture 231 into the first attachment internal bore 191 of the first attachment member 141 between the first restricting wall 241 and the first yielding wall 251. The first restricting wall 241 inhibits the flow of the adhesive thereby such that the flowable adhesive migrates toward the first yielding wall 251 to fill the void between the first attachment internal bore 191 and the first hose 111.

Figure 19:
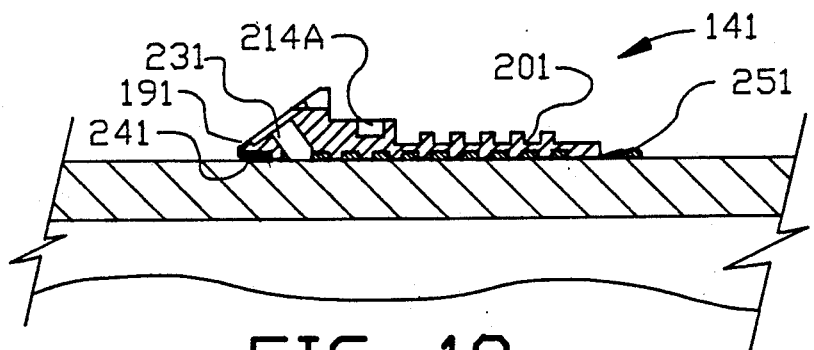
FIG. 19 is a sectional view of the attachment member of FIG. 17 being totally filled with a flowable adhesive.

FIG. 19 illustrates the continued introduction of the flowable adhesive through the first input aperture 231 resulting in the first yielding wall 251 permitting the flow of the adhesive thereby to exit past the first yielding wall 251. The flow of the adhesive past the first yielding wall 251 indicates that the void between the first attachment internal bore 191 and the first hose 111 is totally occupied by the flowable adhesive. The excess adhesive which exits past the first yielding wall 251 may be removed by conventional means.

Figure 20:
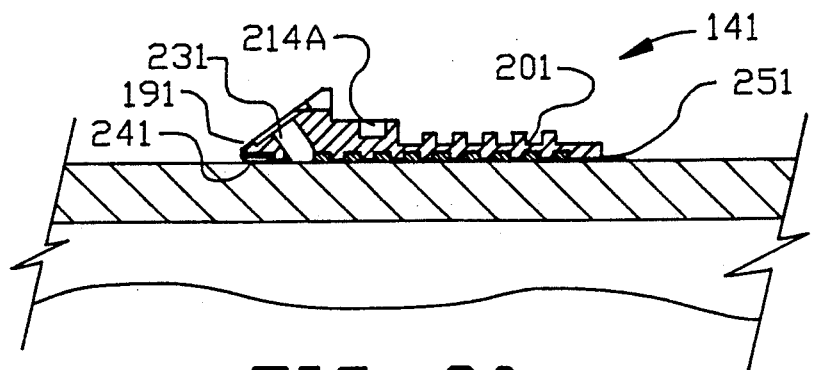
FIG. 20 is a sectional view of the attachment member of FIG. 17 being totally affixed to the standard diameter hose.

FIG. 20 illustrates the flowable adhesive bonded to the first hose 111 and creating first hose threads 111B bonded to the first hose 111. The first hose threads 111B of the first hose 111 threadably engaging with the first affixing threads 221 of the first attachment member 141 for securing the first hose 111 to the first attachment member 141. The threadably engagement of the first hose threads 111B with the first affixing threads 221 removably secures the first hose 111 to the first attachment member 141.

The flowable adhesive bonds only to the hose 111 and does not form a bond with the polymeric material of the first coupling member 121. It should be appreciated that the adhesive exactly duplicates the first affixing threads 221 to provide a strong and fluid tight seal therebetween. In addition this exact duplication inhibits rotation of hose 111 relative to the first coupling member 121. However, if it is desired, the first coupling member 121 can be rotated and removed from the first hose 111.

FIGS. 21-24 illustrate the method of inserting a flowable adhesive within the first attachment internal bore 191 to bond with a hose 111D wherein the diameter of the hose 111D is significantly smaller than the diameter of the first attachment internal bore 191.

Figure 21:
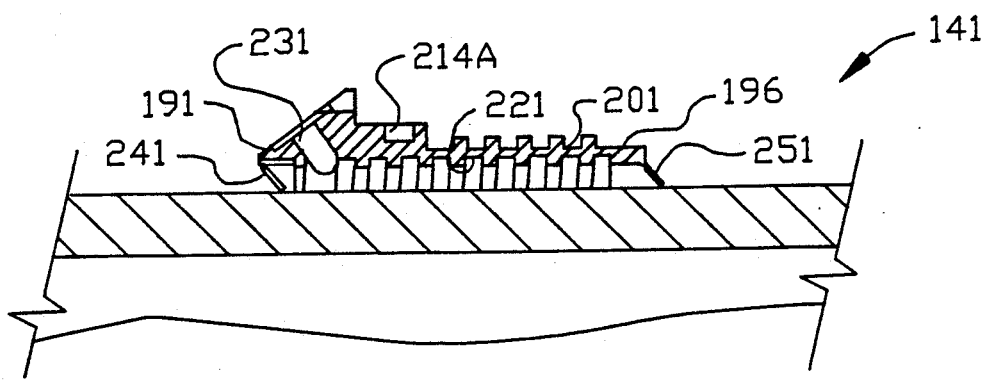
FIG. 21 is a side sectional view of the attachment member of FIGS. 12-16 with a small diameter hose being disposed therein.

FIG. 21 illustrates the hose 111D inserted into the first attachment bore 191 from the outer attachment end 194 with the diameter of the hose 111D inwardly flexing the first restricting wall 241 and the first yielding wall 251 to center the hose 111D within the attachment internal bore 191.

Figure 22:
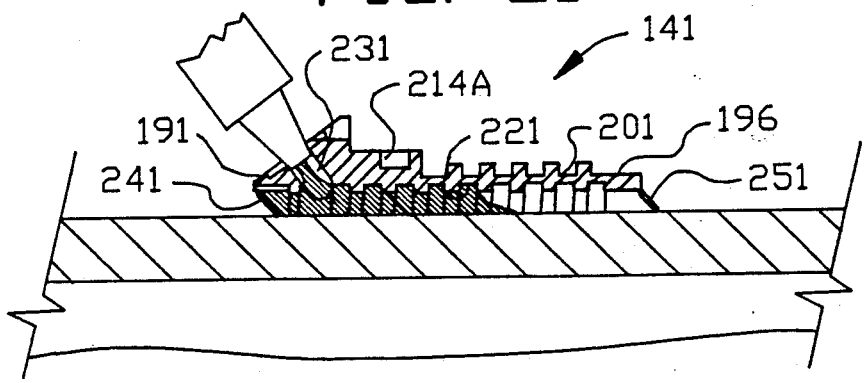
FIG. 22 is a sectional view of the attachment member of FIG. 21 being partially filled with a flowable adhesive.

FIG. 22 illustrates the introduction of the flowable adhesive through the first input aperture 231 into the first attachment internal bore 191 with the first restricting wall 241 inhibiting the flow of the adhesive thereby such that the flowable adhesive migrates toward the first yielding wall 251 to fill the void between the first attachment internal bore 191 and the hose 111D.

Figure 23:
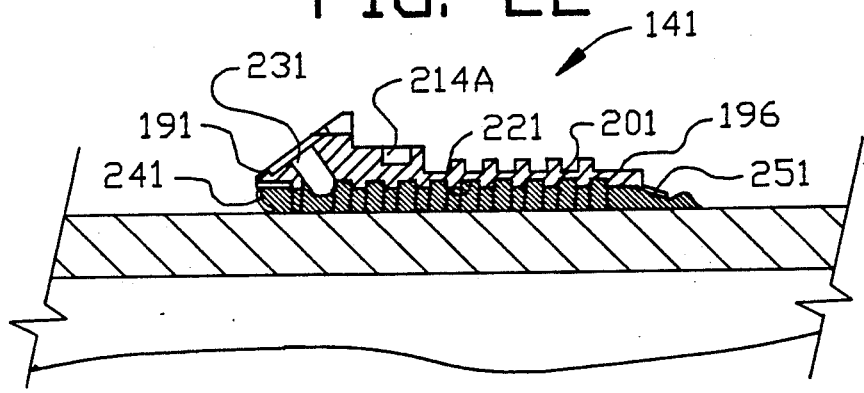
FIG. 23 is a sectional view of the attachment member of FIG. 21 being totally filled with a flowable adhesive.

FIG. 23 illustrates the continued introduction of the flowable adhesive through the first input aperture 231 resulting in the first yielding wall 251 permitting the flow of the adhesive thereby and to exit past the first yielding wall 251.

Figure 24:
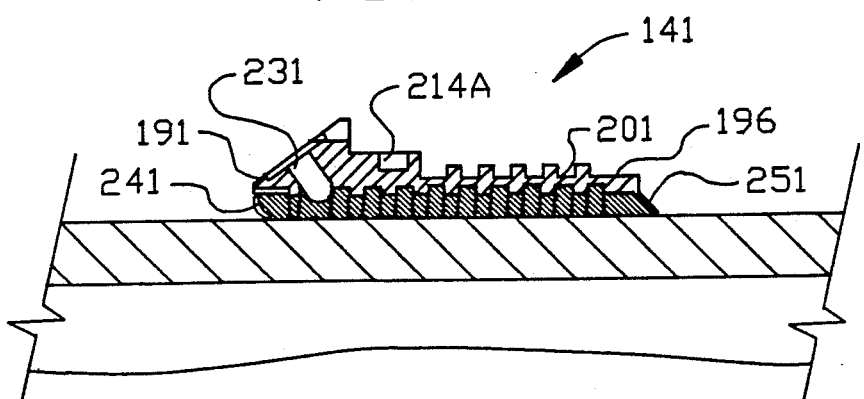
FIG. 24 is a sectional view of the attachment member of FIG. 21 being totally affixed to the small diameter hose.

FIG. 24 illustrates the flowable adhesive bonded to the hose 111D and creating hose threads 111E bonded to the hose 111D for threadably engaging with the first affixing threads 221 of the first attachment member 141 for securing the first hose 111D to the first attachment member 141.

Figure 25:
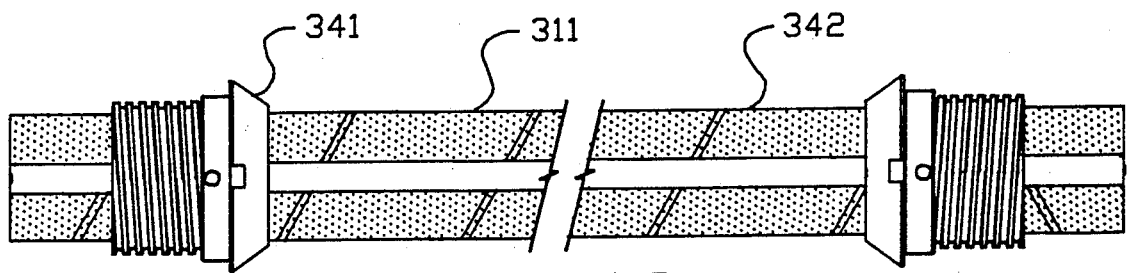
FIG. 25 is a side elevational view of a section of hose affixed to plural attachment members.

FIG. 25 is a side elevational view of a hose section 311 with plural attachment members 341 and 342 being secured thereto. In this embodiment, the hose section 311 is preformed with the plural attachment members 341 and 342 and is supplied to a user in lieu of a separate hose the plural attachment members 341 and 342. Since the volume of the polymeric material required for the plural attachment members 341 and 342 is relatively small, and since the plural attachment members 341 and 342 can be bonded to the hose section 311 by automatic machinery, the additional cost of supplying the preformed hose section 311 with the plural attachment members 341 and 342 is only about $0.01 per linear foot more than conventional hose sections. However, the convenience and rapid replacement of hose sections with the present invention more than offsets the additional cost of the preformed hose sections 311.

Figure 26:
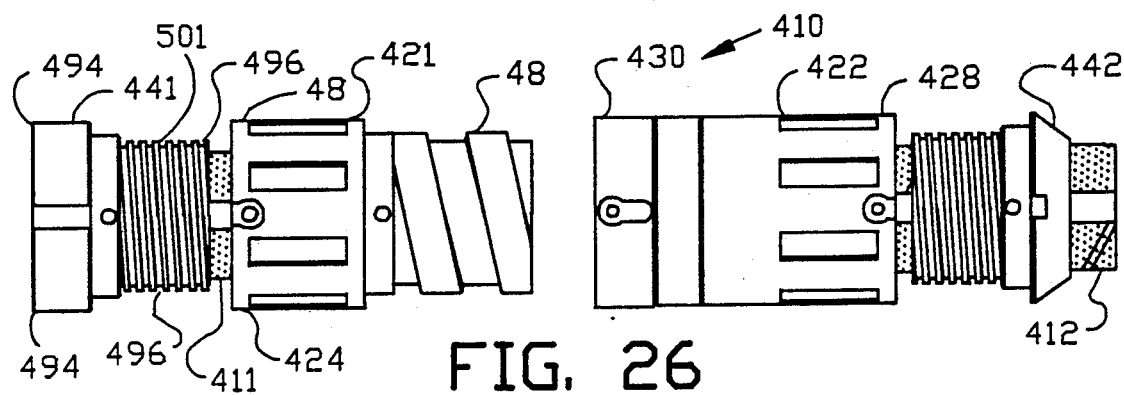
FIG. 26 is a side elevational view of a second embodiment of the improved coupling apparatus of the present invention in an uncoupled position.
Figure 27:
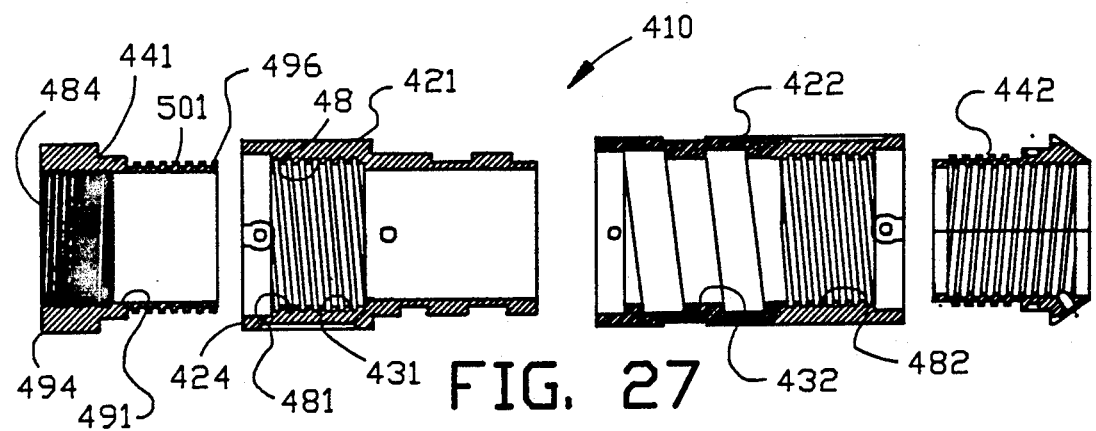
FIG. 27 is a side elevational view of the improved coupling apparatus of FIG. 26.
Figure 28:
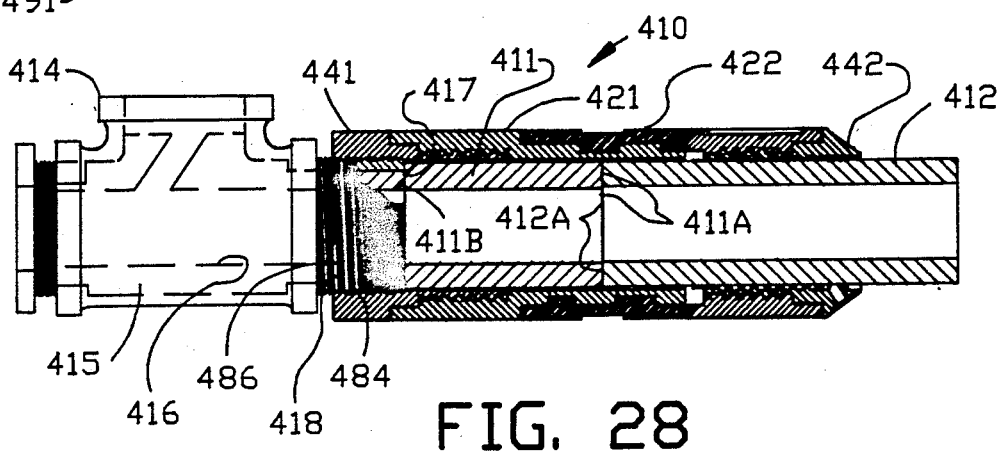
FIG. 28 is a side elevational view of the improved coupling apparatus of FIGS. 25–27 coupled to a conventional T coupling.

FIG. 26-28 illustrate a second embodiment of the improved coupling apparatus 410 of the present invention for securing a T-coupling 414 through a first hose 411 to a second hose 412. The T-coupling 414 may be a conventional T-joint but is shown as a T-coupling 414 incorporating the improved mixing device set forth in my pending U.S. Pat. application Ser. No. 215,004 filed July 5, 1988 with is incorporated by reference into the instant specification. In accordance with my pending U.S. Pat. application Ser. No. 215,004 filed July 5, 1988, the metallic T-coupling 414 comprises a polymeric insert 415 defining an aperture 416 and an end face 417 in a nipple 418.

The improved coupling apparatus 410 comprises a first coupling member 421, a second coupling member 422 as well as a first attachment member 441 and a second attachment member 442. In this embodiment, the first and second coupling members 421 and 422 are identical to the first and second coupling members 121 and 122 and the second attachment member 442 is identical to the second attachment member 142 shown in FIGS. 5-25. The first coupling member 421 includes first coupling linking threads 481 defined by the first coupling internal bore 431 of the first coupling member proximate the outer end 424 of the first coupling member 421.

The first attachment member 441 includes a first attachment internal bore 491 extending between an outer end 494 and an inner end 496 of the first attachment member 441. First attachment linking threads 501 are defined on an outer surface proximate the inner end 496 of the first attachment member 441. The first attachment linking threads 501 are engagable with the first coupling linking threads 481 for securing the first attachment member 441 to the first coupling member 421.

The first and second hoses 411 and 412 are positioned within the first and second coupling members 421 and 422 such that the end 411A of the first hose 411 abuts the end 412A of the second hose 412 when the first coupling member 421 is threadably engaged with the second coupling member 422 thereby creating a hose-to-hose seal.

In this embodiment, the first attachment member 441 includes a first attachment machine threads 484 disposed on the outer end 494 of the first attachment member 441. The first attachment machine threads 484 engage with machine threads 486 of the nipple 418 extending from the T-coupling 414. The first hose 411 is also positioned within the first coupling member 421 such that an end 411B of the first hose 411 abuts the end face 417 of the polymeric insert 415 thereby creating a hose-to-end face seal. The first hose 411 is retained within the first coupling member 421 by the end 411B of the first hose 411 engaging the end face 417 of the polymeric insert 415 and the end 411A engaging the end 412A of the second hose 412.

The apparatus and method of the present invention provides a simple and low cost means for creating and repairing fluid tight couplings between the coupling members and furthermore, since the adhesive material does not adhere to the first coupling member, the coupling member may be reused if the hose is deemed to be defective or deteriorated to a point beyond safe use. In addition, hose sections may be preformed with plural attachment members and be supplied to users to provide convenience and rapid replacement of hose sections for the user. Furthermore, the apparatus and method of the present invention is suitable for use with T-couplings such as sand-air mixing devices of conventional design or specific design.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A coupling apparatus for coupling a first hose end of a first hose to a second end of a second hose for enabling the flow of fluid therethrough, comprising in combination:

first coupling member having an inner end and an outer end with a first coupling internal bore extending therebetween;

first coupling threads defined in said first coupling member proximate said inner end of said first coupling member;

first coupling linking threads defined by said first coupling internal bore of said first coupling member proximate said outer end of said first coupling member;

a second coupling member having second coupling threads defined therein;

said second coupling member being secured to the second hose;

first attachment member having first attachment linking threads;

first affixing means for affixing said first attachment member to the first hose remote from the first end of the first hose;

said first attachment linking threads being engagable with said first coupling linking threads for securing the first hose to said first coupling means; and said first coupling threads being engagable with said second coupling threads for interconnecting said first coupling member and said second coupling member with the first end of the first hose engaging with the second end of the second hose.

2. A coupling apparatus as set forth in claim 1, wherein said first coupling threads are defined on an exterior surface of said first coupling member;

said second coupling threads being defined in an internal bore of said second coupling member; and said first coupling member being insertable into said second coupling internal bore of said second coupling member when said first coupling threads engage with said second coupling threads.

3. A coupling apparatus as set forth in claim 2, wherein said first and second coupling members are constructed of a resilient material for enabling radial expansion of said first and second coupling members upon the application of a fluid pressure within the first hose; and means secured to said second coupling member for inhibiting radial expansion of said second coupling member to enable said radial expansion of said first coupling member within said second coupling member to create a fluid tight seal therebetween.

4. A coupling apparatus as set forth in claim 3, wherein said first and said second coupling members are constructed of a polymeric material.

5. A coupling apparatus as set forth in claim 1, wherein said first attachment member extends between an inner end and an outer end of said first attachment member;

said first attachment linking threads being defined on an outer surface of said first attachment member proximate said inner end of said first attachment member; and said inner end of said first attachment member being insertable into said first coupling internal bore proximate said outer end of first coupling member for enabling said first attachment linking threads to engage with said first coupling linking threads of said first coupling member.

6. A coupling apparatus as set forth in claim 1, including a first and a second coupling locking aperture disposed in said first and said second coupling members, respectively; and a coupling locking pin cooperating with said first and second coupling locking apertures to releasably inhibit relative rotation between said first and second coupling members.

7. A coupling apparatus for coupling a first hose to a second hose for enabling the flow of fluid therethrough, comprising in combination:

first coupling member having an inner end and an outer end with a first coupling internal bore extending therebetween;

first coupling threads defined in said first coupling member proximate said inner end of said first coupling member;

first coupling linking threads defined by said first coupling internal bore of said first coupling member proximate said outer end of said first coupling member;

a second coupling member having second coupling threads defined therein;

said second coupling member being secured to the second hose;

first attachment member having first attachment linking threads;

first affixing means for affixing the first hose attachment member to the first hose;

said first affixing means includes a first attachment internal bore for receiving the first hose therein and first affixing threads defined in said internal bore of said first attachment member;

said first attachment linking threads being engagable with said first coupling linking threads for securing the first hose to said first coupling means; and said first coupling threads being engagable with second coupling threads for interconnecting said first coupling member and said second coupling member for coupling the first hose to the second hose.

8. A coupling apparatus as set forth in claim 7, wherein said first affixing means includes a first input aperture defined in said first attachment member and communicating with said first attachment internal bore; and said input aperture providing means for inserting a flowable adhesive into said first attachment internal bore for bonding said flowable adhesive to the first hose.

9. A coupling apparatus as set forth in claim 8, wherein said inserted flowable adhesive cures within said first attachment internal bore and bonds to the first hose thereby creating first hose threads; and said first hose threads of the first hose cooperating with said first affixing threads of said first attachment members for securing the first hose to said first attachment member.

10. A coupling apparatus as set forth in claim 9, wherein said flowable adhesive bonds to the first hose and occupies a void located between said first attachment internal bore and the first hoses thereby creating said first hose threads for threadably engaging with said first affixing threads of said first attachment member.

11. A coupling apparatus as set forth in claim 10, including a first restricting wall disposed in said first attachment internal bore for engaging with the first hose;

a first yielding wall disposed in said first attachment internal bore for engaging with the first hose;

said first restricting wall restricting the flow of said flowable adhesive from said first attachment internal bore and said first yielding wall permitting the flow of said flowable adhesive from said first attachment internal bore to enable the flowable adhesive to occupy the entire void located between said first attachment internal bore and the first hose.

12. A coupling apparatus as set forth in claim 11, wherein said first input aperture is disposed between said first restricting wall and said first yielding wall.

13. A coupling apparatus as set forth in claim 12, wherein said first restricting wall and said first yielding wall of said first attachment internal bore engage with the first hose to center the first hose within said first attachment internal bore.

14. A coupling apparatus as set forth in claim 13, wherein said first restricting wall and said first yielding wall of said first attachment internal bore resiliently engage with the first hose within said first attachment internal bore.

15. A coupling apparatus as set forth in claim 13, wherein said first restricting wall and said first yielding wall are annular walls extending into said first attachment internal bore to resiliently engage with the first hose within said attachment internal bore.

16. A coupling apparatus as set forth in claim 13, wherein said first restricting wall and said first yielding wall are integrally formed with said first attachment member.

17. A coupling apparatus as set forth in claim 1, including an undercut portion disposed on said inner end of said first coupling member;

said first coupling threads being located on said undercut portion of said first coupling member;

said inner end of said second coupling member including an enlarged internal bore defined in said second internal bore of said second coupling member;

said enlarged internal bore being enlarged relative to said second internal bore of said second coupling member;

said second coupling threads being located on said enlarged internal bore; and said enlarged internal bore of said second coupling member being established to receive said undercut portion of said first coupling member therein with said first coupling threads threadably engaging said second coupling threads.

18. A coupling apparatus as set forth in claim 1, including first attachment locking apertures disposed in each of said first coupling member and said first attachment member; and a first attachment locking pin cooperating with said first attachment locking apertures to releasably inhibit relative rotation between said first coupling member and said first attachment member.

19. A coupling apparatus as set forth in claim 1, including first grasp means located on said first coupling member and second grasp means located on said second coupling member for facilitating relative rotation between said first and second coupling threads of said first and said second coupling members.

20. A coupling apparatus for coupling a first end of a first hose to a second end of second hose to enable the flow of fluid therethrough, comprising in combination:

first coupling member having an inner end and an outer end with a first coupling internal bore extending therebetween;

first coupling threads disposed proximate said inner end of said first coupling member;

first coupling linking threads defined in said first coupling internal bore proximate said outer end of said first coupling member;

a second coupling member having an inner end and outer end with a second coupling internal bore extending therebetween;

second coupling threads defined in said second coupling disposed proximate said inner end of said first coupling member;

second coupling linking threads defined in said second coupling internal bore proximate said outer end of said second coupling member;

first attachment member having first attachment linking threads;

first affixing means for affixing said first attachment member to the first hose remote from the first end of the first hose;

second hose attachment member having second attachment linking threads;

second affixing means for affixing said second attachment member to the second hose remote from the second end of the second hose;

said first attachment linking threads being engagable with said first coupling linking threads for securing the first hose to said first coupling member;

said second attachment linking threads being engagable with said second coupling linking threads for securing the second hose to said second coupling member; and said first coupling threads being engagable with said second coupling threads for interconnecting said first coupling member and said second coupling member for joining the first hose to the second hose with the first end of the first hose engaging with the second end of the second hose.

21. A coupling apparatus as set forth in claim 20, wherein said first coupling threads are defined on an exterior surface of said first coupling member;

said second coupling threads being defined in said second coupling internal bore of said second coupling member; and said first coupling member being insertable into said second coupling internal bore of said second coupling member when said first coupling threads engages with said second coupling threads.

22. A coupling apparatus as set forth in claim 21, wherein said first and second coupling member are constructed of a resilient material for enabling radial expansion of said first and second coupling members upon the application of a fluid pressure within the first and second hoses; and means secured to said second coupling member for inhibiting radial expansion of said second coupling member to enable said radial expansion of said first coupling member within said second coupling member to create a fluid tight seal therebetween.

23. A coupling apparatus as set forth in claim 20, wherein said first attachment member extends between an inner end and an outer end of said first attachment member;

said first attachment linking threads being defined on an outer surface of said first attachment member proximate said inner end of said first attachment member;

said inner end of said first attachment member being insertable into said first coupling internal bore proximate said outer end of first coupling member for enabling said first attachment linking threads to engage with said first coupling linking threads of said first coupling member;

said second attachment member extends between an inner end and an outer end;

said second attachment linking threads being defined on an outer surface of said second attachment member proximate said inner end of said second attachment member;

said second inner attachment end of said second attachment member being insertable into said second coupling internal bore proximate said outer end of second coupling member for enabling said second attachment linking threads to engage with said second coupling linking threads of said second coupling member.

24. A coupling apparatus as set forth in claim 23, including a first and a second coupling locking apertures disposed in said first and said second coupling members, respectively; and coupling locking pin cooperating with said first and second coupling locking apertures to releasably inhibit relative rotation between said first and second coupling members.

25. A coupling apparatus as set forth in claim 1, wherein said first affixing means includes a first attachment internal bore for receiving the first hose therein;

first affixing threads defined in said first attachment internal bore of said first attachment member;

said second affixing includes a second attachment internal bore defined in said second hose attachment member for receiving the second hose therein; and second affixing threads defined in said second attachment internal bore of said second hose attachment.

26. A coupling apparatus as set forth in claim 25, wherein said first affixing means includes a first input aperture defined in said first attachment member and communicating with said first attachment internal bore;

said second affixing means includes a second input aperture defined in said second attachment member and communicating with said second attachment internal bore; and said input apertures providing means for inserting a flowable adhesive into said first and second attachment bores for bonding said flowable adhesive to the first and the second hoses, respectively.

27. A coupling apparatus as set forth in claim 26, wherein said inserted flowable adhesive cures within said first and second attachment internal bores and bonds to the first and the second hoses thereby creating first and second hose threads bonded to the first and the second hose, respectively; and said first and second hose threads of the first and second hoses cooperating with said first and second affixing threads of said first and second attachment members for securing the first and second hoses to said first and second attachment members, respectively.

28. A coupling apparatus as set forth in claim 27, wherein said flowable adhesive bonds to the first and the second hoses and occupies voids located between the first and second attachment internal bores and the first and the second hoses for creating said first and second hose threads bonded to the first and second hoses for threadably engaging with said first and second affixing threads, respectively.

29. A coupling apparatus as set forth in claim 28, including a first restricting wall disposed in said first attachment internal bore for engaging with the first hose;

a first yielding wall disposed in said first attachment internal bore for engaging with the first hose;

said first restricting wall restricting the flow of said flowable adhesive from said first attachment internal bore and said first yielding wall permitting the flow of said flowable adhesive from said first attachment internal bore to enable the flowable adhesive to occupy the entire void located between said first attachment internal bore and the first hose;

a second restricting wall disposed in said second attachment internal bore for engaging with the second hose;

a second yielding wall disposed in said second attachment internal bore for engaging with the second hose;

said second restricting wall restricting the flow of said flowable adhesive from said second attachment internal bore and said second yielding wall permitting the flow of said flowable adhesive from said second attachment internal bore to enable the flowable adhesive to occupy the entire void located between said second attachment internal bore and the second hose.

30. A coupling apparatus as set forth in claim 29, wherein said first input aperture is disposed between said first restricting wall and said first yielding wall; and said second input aperture being disposed between said second restricting wall and said second yielding wall.

31. A coupling apparatus as set forth in claim 30, wherein said first restricting wall and said first yielding wall of said attachment internal bore engage with the first hose to center the first hose within said attachment internal bore; and said second restricting wall and said second yielding wall of said attachment internal bore engage with the second hose to center the second hose within said attachment internal bore.

32. A coupling apparatus as set forth in claim 31, wherein said first restricting wall and said first yielding wall of said attachment internal bore resiliently engage with the first hose within said first attachment internal bore; and said second restricting wall and said second yielding wall of said attachment internal bore resiliently engage with the second hose within said second attachment internal bore.

33. A coupling apparatus as set forth in claim 29, wherein said first restricting wall and said first yielding wall are annular walls extending into said attachment internal bore to resiliently engage with the first hose within said attachment internal bore; and said second restricting wall and said second yielding wall are annular walls extending into said attachment internal bore to resiliently engage with the second hose within said attachment internal bore.

34. A coupling apparatus as set forth in claim 29, wherein said first restricting wall and said first yielding wall are integrally formed with said first attachment member from a polymeric material; and said second restricting wall and said second yielding wall being integrally formed with said second attachment member from a polymeric material.

35. A coupling apparatus as set forth in claim 20, including an undercut portion disposed on said inner end of said first coupling member;

said first coupling threads being located on said undercut portion of said first coupling member;

said inner end of said second coupling member including an enlarged internal bore defined in said second internal bore of said second coupling member;

said enlarged internal bore being enlarged relative to said second internal bore of said second coupling member;

said second coupling threads being located on said enlarged internal bore; and said enlarged internal bore of said second coupling member being established to receive said undercut portion of said first coupling member therein with said first coupling threads threadably engaging said second coupling threads.

36. A coupling apparatus as set forth in claim 35, wherein the first hose extends into said first coupling member proximate to said undercut portion of said first coupling member;

the second hose extending into said second coupling member proximate said second coupling threads of said second coupling member enabling an end of the first hose to abut against an end of the second hose for forming an end to end seal between the first hose and the second hose and to prevent the flow of fluid from abrading said first and said second coupling members.

37. A coupling apparatus as set forth in claim 20, including first attachment locking apertures disposed in each of said first coupling member and said first attachment member;

a first attachment locking pin cooperating with said first attachment locking apertures to releasably inhibit relative rotation between said first coupling member and said first attachment member;

second attachment locking apertures disposed in each of said second coupling member and said second attachment member; and a second attachment locking pin cooperating with said second attachment locking apertures to releasably inhibit relative rotation between said second coupling member and said second attachment member.

38. A coupling apparatus as set forth in claim 20, including first grasp means located on said first coupling member and second grasp means located on said second coupling member for facilitating relative rotation between said first and second coupling threads of said first and said second coupling members.

39. A method of attaching a first coupling member to an end of a first hose, the first coupling member comprising an internal bore extending through the first coupling member and with first coupling linking threads defined in the internal bore, the method comprising the steps of:

forming a first attachment member including first attachment linking threads and a first attachment internal bore for receiving the first hose therein;

forming first affixing threads in the first attachment internal bore of the first attachment member;

forming a first restricting wall disposed in the first attachment internal bore for engaging with the first hose;

forming a first yielding wall disposed in the first attachment internal bore for engaging with the first hose;

forming a first input aperture in the first attachment member to communicate with the first attachment internal bore with the first input aperture being disposed between the first restricting wall and the first yielding wall;

inserting the end of the first hose into the first attachment internal bore to with the first restricting wall and the first yielding wall engaging with the first hose;

inserting flowable adhesive into the first input aperture enabling the adhesive to flow into the first attachment internal bore with the first restricting wall restricting the flow of the flowable adhesive from the first attachment internal bore and with the first yielding wall permitting the flow of the flowable adhesive from the first attachment internal bore to enable the flowable adhesive to occupy the entire void located between the first attachment internal bore and the first hose; and curing the adhesive within the first attachment internal bore to bond to the first hose thereby creating first hose threads bonded to the first hose with the first hose threads cooperating with the first affixing threads of the first attachment member for securing the first hose to the first attachment member; and threading the first attachment linking threads of the first attachment member into the first coupling linking threads of the first coupling member for attaching the first hose to the first coupling member.

40. The method of attaching a first coupling member as set forth in claim 39 wherein, the step of forming the first attachment member includes molding the first attachment member from a polymeric material.

41. The method of attaching a first coupling member as set forth in claim 40 wherein, the step of forming the first affixing threads in the first attachment internal bore includes molding the first affixing threads integrally with the first attachment member from a polymeric material.

42. The method of attaching a first coupling member as set forth in claim 41 wherein, the step of forming the first restricting wall and the first yielding wall includes molding the first restricting wall and the first yielding wall integrally with the first attachment member from a polymeric material.

* * * * *